(12) United States Patent
Grave et al.

(10) Patent No.: US 8,707,908 B2
(45) Date of Patent: Apr. 29, 2014

(54) POULTRY WEIGHING APPARATUS

(75) Inventors: Johann Grave, Schwichteler (DE);
Bernard Heinrich Südkamp, Dinklage (DE)

(73) Assignee: Big Dutchman International GmbH, Vechta (DE)

( * ) Notice: Subject to any disclaimer, the term of this patent is extended or adjusted under 35 U.S.C. 154(b) by 639 days.

(21) Appl. No.: 12/484,525

(22) Filed: Jun. 15, 2009

(65) Prior Publication Data
US 2009/0320761 A1 Dec. 31, 2009

(30) Foreign Application Priority Data

Jun. 13, 2008 (DE) ...................... 20 2008 007 880 U

(51) Int. Cl.
*A01K 45/00* (2006.01)
*G01G 17/08* (2006.01)

(52) U.S. Cl.
CPC ................ *A01K 45/00* (2013.01); *G01G 17/08* (2013.01)
USPC .......................................................... 119/842

(58) Field of Classification Search
CPC ................................ A01K 45/00; G01G 17/08
USPC .......... 119/842, 840, 841; 356/614, 615, 621, 356/616
See application file for complete search history.

(56) References Cited

U.S. PATENT DOCUMENTS

| 4,624,215 | A | * | 11/1986 | Goldstein | .................. 119/51.01 |
|---|---|---|---|---|---|
| 4,640,231 | A | * | 2/1987 | Turner et al. | .................. 119/842 |
| 5,474,085 | A | | 12/1995 | Hurnik et al. | |
| 5,699,161 | A | * | 12/1997 | Woodworth | .................. 356/628 |
| 6,895,893 | B2 | * | 5/2005 | Larsen | ........................ 119/51.02 |
| 7,039,220 | B2 | * | 5/2006 | Kriesel | ......................... 382/110 |
| 7,798,890 | B2 | * | 9/2010 | Gerrits et al. | .................... 452/53 |
| 2002/0152967 | A1 | * | 10/2002 | van der Lely et al. | ......... 119/61 |
| 2003/0168014 | A1 | * | 9/2003 | Aarts et al. | ................. 119/14.02 |
| 2003/0226522 | A1 | * | 12/2003 | Thibault | ....................... 119/842 |
| 2005/0217592 | A1 | | 10/2005 | Larsen | |
| 2007/0056529 | A1 | * | 3/2007 | Baarsch et al. | ............... 119/842 |
| 2007/0125312 | A1 | * | 6/2007 | Boyd et al. | .................... 119/721 |
| 2007/0288249 | A1 | * | 12/2007 | Rowe et al. | ....................... 705/1 |

FOREIGN PATENT DOCUMENTS

| EP | 0 589 534 A1 | 3/1994 |
|---|---|---|
| EP | 1 250 838 A2 | 10/2002 |
| FR | 2 507 776 | 12/1982 |
| GB | 1 407 195 | 9/1975 |

* cited by examiner

*Primary Examiner* — Kimberly Berona
*Assistant Examiner* — Joshua Huson
(74) *Attorney, Agent, or Firm* — Price Heneveld LLP

(57) ABSTRACT

A poultry weighing apparatus includes a support surface configured to permit at least one fowl to stand thereon. A force sensor is operably connected with the support surface, and detects the weight of the fowl or fowls on the support surface. A second sensor is operably connected with the support surface, and detects at least one additional physical characteristic, other than weight, of the fowl or fowls standing on the support surface.

12 Claims, 3 Drawing Sheets

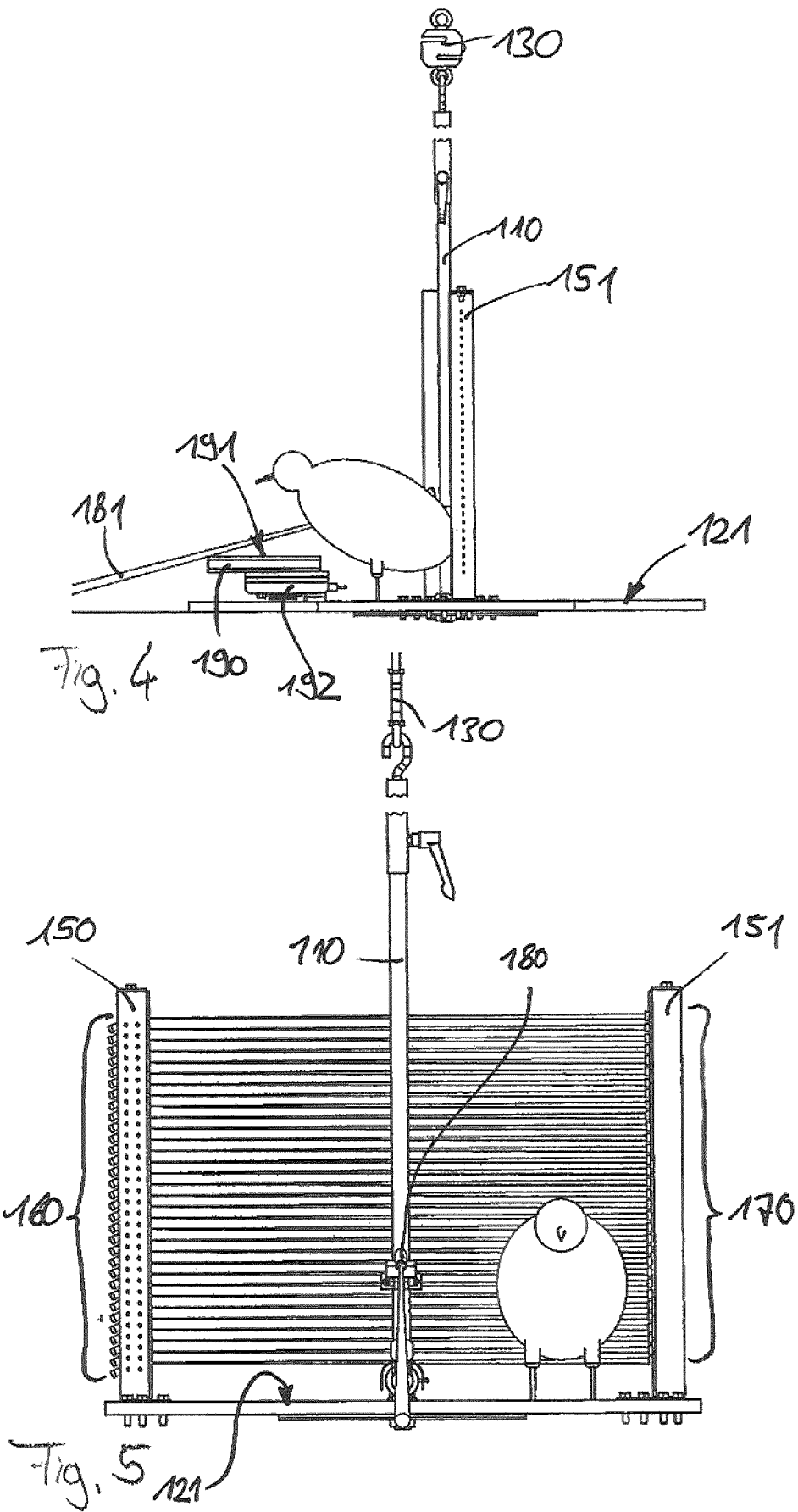

POULTRY WEIGHING APPARATUS

CLAIM OF PRIORITY

Applicants hereby claim the priority benefits under the provisions of 35 U.S.C. §119, basing said claim of priority on German Patent Application Serial No. 20 2008 007880.6, filed Jun. 13, 2008. In accordance with the provisions of 35 U.S.C. §119 and Rule 55(b), a certified copy of the above-listed German patent application will be filed before grant of a patent.

BACKGROUND OF THE INVENTION

The present invention relates to poultry weighing devices, and in particular to poultry weighing devices of the type having a support surface which is so adapted that at least one fowl can stand thereon, and a force sensor which is so coupled to the support surface that it can detect the force associated with the weight of the fowl or fowls standing on the support surface.

Poultry weighing apparatuses of the type noted above are used in poultry fattening husbandry to measure the weight of the animals over the fattening period, and thereby to monitor the development and health of the animals for purposes of determining the appropriate time for removing them from their coops. Some prior art poultry weighing apparatuses are arranged in a poultry coop in such a way that they have a support surface which is arranged in a hanging relationship just above the coop floor on which the fowls usually stand, and a force sensor coupled into the support fixing, above the support surface, to detect the weight of one or more animals which are on the support surface of the apparatus. In another previously known configuration, the support surface is arranged above the floor on which the fowls usually stand, and is supported on that floor by way of one or more force sensors to detect the weight of fowls which are on the support surface of the apparatus.

Poultry weighing apparatuses of the above-described kind are typically used in particular in raising broilers. However, it will be understood that the subject poultry weighing apparatuses are suitable for any kind of poultry, and can be used for measuring weight. In addition, poultry weighing apparatuses of the above-described structure can also be used for measuring the weight of other animals. In particular, such applications may require adaptation in terms of size, with which one skilled in the art is familiar, particularly as to the measurement range of the force sensor, and of the support surface in order to be able to accommodate and measure the respective animals.

Poultry weighing apparatuses of the above-described fashion make it possible to achieve improved monitoring of the animal stock in a coop unit, but it is known that, in spite of the use of poultry weighing apparatuses, regular additional monitoring by the poultry farmer is required to detect the development of the poultry stock and to discover diseases therein. The success of such additional monitoring measures on the part of the poultry farmer depends upon the level of experience and knowledge of the poultry farmer. In unfavorable cases, in spite of monitoring with a poultry weighing apparatus and by the poultry farmer, diseases within the poultry stock may not be detected at an early time, which can lead to spread of the disease within the poultry stock. One objective of this invention is to permit improved monitoring of poultry stocks in order to be able to provide the poultry farmer with improved information about abnormal developments of the fowls.

A further problem with poultry husbandry lies in determining the proper moment in time for removing the poultry from the coop. The ideal coop removal time is usually determined on the basis of a standard weight which the animal stock should have on average. If the average standard weight is ascertained solely on the basis of measurements with a poultry weighing apparatus within the cage unit, in certain situations measurement errors arise, which, for example, are due to the fact that only given, for example, particularly active animals are measured and, when calculating the average weight, other inactive animals, which for example may be of a greater weight, are not involved in the weight measurement procedure. Another objective of this invention is to permit the poultry farmer to determine the coop removal time on the basis of a sound data position in order to be able to provide more accurate information about the average weight of the animal stock.

A further problem in terms of poultry husbandry is estimating the slaughter weight from the average weight of the fowls within the coop unit. Depending on the specific raising conditions, room for movement, form of nutrition, and other factors, a poultry stock can develop in different ways, and as a result, different relationships can arise as between fowl weight and slaughter weight. Another objective of this invention is to permit the poultry farmer to arrive at a better estimate of the slaughter weight on the basis of the fowl weight.

There is a fundamental need for investigating poultry stocks for other features, for example sex, breed, or the like and to obtain information thereof by an automated procedure. An aim of the invention is to permit such determination of features.

SUMMARY OF THE INVENTION

One aspect of the present invention is a poultry weighing apparatus of the kind described above, which includes a second sensor connected to the support surface for detecting at least one additional physical characteristic of one or more fowls standing on the support surface other than their weight.

The poultry weighing apparatus according to the present invention makes it possible to not only detect the weight of the fowls in a measuring operation, but also to obtain an additional measurement value for the fowl, which is detected practically at the same time as the weight of the fowl, or in time-displaced relationship therewith, at the same location within the coop unit where the poultry weighing apparatus is located. The invention thus affords the advantage that two measurement values are ascertained, and the positional coincidence of the detection range of those measurement values makes it possible to provide an association or comparison with the ideal fowl, so that two measurement values can be related to and associated with each animal. In addition, by combining two sensors in the region of the poultry weighing apparatus, a more simplified structure is provided, both in terms of maintenance procedures and also in respect of coop construction, insofar as the derivation and transmission of the signals of both sensors can be transmitted by a single central cable line or other similar data transfer apparatus, such as for example wireless transfer, etc., from the poultry weighing apparatus to a data acquisition or collection unit.

In principle, it is possible to conceive of a series of different kinds of sensors, thus for example, sensors which detect the color of the animal, sensors which detect one or more temperatures in the region of the body of the animal, sensors which detect the overall or partial volume of the animal, sensors which detect the overall or partial body contour of the animal, sensors which detect the height, length or width of the animal, and the like.

In accordance with the present invention, both the weight force sensor and also the second sensor are operably connected to the support surface, and may be secured to the support surface. While it is not necessary for a direct attachment or arrangement at the support surface, the advantages of the invention are achieved if the two sensors are secured in relation to and proximate with the support surface, so that a common, central data transfer line from the poultry weighing apparatus can be used to provide for detection of the two sensor signals concerning the animal stock which is on the support surface.

In accordance with a first preferred embodiment of the present invention, the second sensor is a sensor for measuring the height of one or more fowls standing on the support surface. The height of the fowls is thereby ascertained as the highly informative second measurement value, which makes it possible to obtain a relationship of weight to height of the animals as a basis for assessing the animal stock. In principle, the sensor used for measuring height can measure in non-contact or contacting fashion.

It is particularly preferred that the sensor for measuring height includes a plurality of light barrier devices arranged in a vertically extending column above the support surface, wherein each includes a radiation emitter and a radiation receiver adapted to detect an interruption in a horizontally extending beam. This configuration may include a series of mutually superposed light barrier devices, which for example can be formed by a plurality of mutually superposed, horizontally extending laser beams and corresponding radiation receivers. If an animal passes into the region of the column of light barrier devices, it interrupts the barrier devices over the extent of its total height, so that the height of the animal can be determined or inferred from the highest uninterrupted light barrier device.

In principle, it is to be understood that the light barrier devices do not necessarily have to be operated with a wavelength in the visible range, but the function according to the invention can be achieved in the same manner by using other wavelengths which may not be visible.

It is particularly advantageous that the light barrier devices are all disposed in a vertically extending plane, and are arranged at uniform spacings relative to each other. The spacing between two immediately adjacent light barrier devices provides a degree of resolution which can be attained with height measurement, in respect of the height measurement sensor field. In certain situations, it may also be advantageous for the spacing to be irregular, for example to arrange more light barrier devices at shorter spacings relative to each other, in those height measurement regions in which particularly accurate resolution is desired.

Height measurement by means of a plurality of light barrier devices arranged in mutually superposed staggered relationship can be implemented in such a way that the radiation emitters are so arranged at a first bar extending vertically from the support surface and the radiation receivers are so arranged at a second vertically extending bar spaced from the first bar, so that the height of a fowl between the bars is detected and measured. In this embodiment, the radiation emitters and the radiation receivers are separated by the space in which the animal whose height is to be measured is disposed. In another configuration of the present invention, the radiation emitters and the radiation receivers can also be arranged along the same bar, and the region in which the animal is to be measured can be delimited by the support bar and a reflection bar, which is spaced from the support bar and reflects the radiation emitted by the radiation emitters on to the radiation receivers.

In accordance with another embodiment of the present invention, the support surface is adapted to receive a plurality of fowls, and the force sensor is connected to an evaluation unit which is adapted to compare changes in the force sensor signal to pre-stored weight data. When the change in the force sensor signal represents a weight change in the fowls on the support surface, which is within a predetermined range, the change in the weight force of a single fowl is stored by the evaluation unit.

In many applications, a problem arises insofar as an individual fowl does not move on to the support surface in a sufficiently reliable and frequent fashion, and therefore cannot be measured in isolation or in a precise fashion. Consequently, it is frequently advantageous to provide a support surface which can receive a plurality of fowls. With that kind of poultry weighing apparatus, measurement of individual fowls can nonetheless be effected by ascertaining the weight force fluctuations caused by fowls stepping onto or jumping down from the support surface through the force sensor signal, and comparing the same to a range of typical forces due to weight of fowls of the respectively corresponding age. When the force sensor signal has changed within such a typical range of weight force, the change is assessed as the measurement of an individual animal, and can be appropriately processed. In that way, it is possible to provide for individual measurement of animals which step onto and jump down from the support surface, even when using support surfaces which receive thereon a plurality of animals.

In an alternative configuration to the above-described embodiment, it is preferable that the support surface is adapted to receive only one fowl at a time, and the force sensor is connected to an evaluation unit which is adapted to compare the force sensor signal to pre-stored weight data. When the force sensor signal represents a weight force which is within a predetermined range in respect of weight force, to store the weight force as the weight force of the individual fowl. This configuration of the support surface is particularly suitable for larger animals, which are motivated to sit on support surfaces of a specific design or configuration. With this embodiment, by comparing the force sensor signal to pre-stored weight data, it is possible to be sure that the fowl is disposed completely on the support surface and not just partly, for example by virtue of the fact that it is only standing with one leg on the support surface, and as a result the full weight of the fowl is not detected as an error situation.

In accordance with a further aspect of the present invention, the poultry weighing apparatus can incorporate a temperature sensor, which is either the second sensor or an additional third sensor, that is operably connected to the support surface, and so arranged that it can measure the body temperature of a fowl on the support surface. With this embodiment, the second sensor is in the form of a temperature sensor, or an additional third sensor for temperature is provided. This arrangement makes it possible to measure the body temperature of the fowl, in addition to the weight, which can give information about the state of health and the well-being of the fowl. Thus, for example, from the temperature of the feet of the fowl it is possible to conclude whether the floor of the coop is at a temperature which is correct for poultry husbandry, and in that way, important information can be afforded for controlling air conditioning data within the coop unit.

In that respect, it is particularly preferred that the temperature sensor is in the form of a non-contact temperature radiation receiver, which receives temperature radiation readings from a defined region in the coop. The use of a temperature sensor which uses radiation measurement makes it is possible to perform a non-contact measurement operation, which is substantially insensitive to dirt, and can measure temperature in a given body region of the fowl.

It is still further preferred that the temperature sensor receives temperature radiation from a defined region, which starting from the temperature sensor extends over the support surface at a downwardly angled orientation, and passes through a horizontal plane directly above the support surface to a location laterally beside the support surface. With this configuration, the region from which the temperature sensor receives the temperature radiation extends in the form of a focused beam region from an elevated position in the direction of the coop floor, and meets the coop floor beside the support surface of the poultry weighing apparatus when the poultry weighing apparatus is installed in the region of a coop floor. This configuration makes it possible, when there is no fowl in the region of the temperature sensor, to directly measure the temperature of the coop floor, whereby it is possible to obtain an additional and directly influencing measurement parameter.

In the aforementioned embodiments in which a temperature sensor is used as the second or a third sensor, it is particularly preferred that the second, third sensor, or even fourth sensor is a temperature sensor which is disposed in the support surface, and detects the temperature of the fowl feet. With this configuration, it is possible to directly measure the temperature of the feet of the fowls or a single fowl and, thereby, arrive directly at a conclusion about the state of health and the well-being of the animal or the husbandry conditions.

In accordance with a further preferred embodiment of the present invention, it is provided that:

a) the support surface is adapted to receive a plurality of fowls;

b) a reduced-size second support surface is provided above the support surface which is adapted to receive precisely one fowl; and c) a contact temperature sensor is arranged in the second support surface which detects the temperature of the fowl feet; and d) a radiation temperature sensor is arranged above the second support surface which receives radiation from the region in which the body of the fowl standing on the second support surface is disposed.

The above-noted embodiment makes it possible for the measurement of the weight force of poultry to be effected in the previously known fashion, by virtue of the provision of a support surface for a plurality of animals, but at the same time, measure the characteristics of individual animals which are on the second support surface can be measured in respect of their weight, their foot temperature, and their body temperature.

The poultry weighing apparatus according to the present invention can also include an evaluation unit, which receives at least the signal from the weight force sensor and the second sensor, and is adapted to compare those signals to predetermined values of a reference table, reference graph, or other similar database. This arrangement permits direct association of the different measurement signals and a representation of the associated measurement signals in respect of the variation over time, and can thus give the poultry farmer a highly informative assessment of the state or condition of the poultry stock.

In accordance with a further embodiment the poultry weighing apparatus, a camera may be provided, which is connected to the support surface, and which is the second sensor or an additional sensor, and is adapted to detect the contour of a fowl or of a part of a fowl. Such a camera makes it possible to detect the volume and the overall height of the body of a fowl in order thereby to obtain a measurement parameter relating to the weight force, which provides important information about the state of health and fattening of the fowl. In addition, such a camera can make it possible to detect and examine given parts of the body of a fowl to obtain information about certain properties of the bird. Thus, it is possible for example, by detecting the body region of a fowl, to provide for sex identification on the basis of the presence or absence of a cockscomb.

A further aspect of the present invention is a poultry coop installation, comprising a poultry weighing apparatus according to the invention as set forth above, in combination with a drinking trough and/or feeding mechanism coupled with an actuator in such a way that the height of the drinking trough and/or feeding mechanism can be adjusted by the actuator. A control unit, which receives at least one height signal from the second sensor of the poultry weighing apparatus, which is in the form of a height measuring sensor, evaluates the height signal, and is operably connected with the actuator to actuate same in accordance with the signal from the height measuring sensor.

This arrangement permits automated adaptation of the height of the drinking trough and the feeding mechanism within a coop unit. It is particularly advantageous for successfully raising poultry and the like that both the drinking trough and the feeding mechanism not to be positioned excessively low, which leads to severe soiling of the coop region, or excessively high, which makes it difficult for smaller animals in the stock to have access to the drinking trough and the feeding mechanism, or would even make such access impossible. The drinking trough and the feeding mechanism can always be arranged at the ideal height by automated height detection of the poultry, and height adjustment of the drinking trough and the feeding mechanism as a function of the ascertained height of the poultry stock. In that respect, it is to be understood that individual measurement of the height of the fowls is required for determining the ideal height, in order to ascertain that ideal height on the basis of the smallest bird.

The poultry coop installation according to the invention can preferably be operated in accordance with a method of operating a poultry raising coop, which includes the following steps: measuring the height of one or more fowls in the poultry raising coop by a height measuring device, possibly filtering the height measurement values and/or averaging from the height measurement values through use of an evaluation unit, actuating an actuator through use of the evaluation unit in accordance with the height measurement values, and adjusting the height of the drinking trough and/or the feeding mechanism by operating the actuator.

Operation in accordance with the above method achieves a highly automated operation of the poultry raising coop, which is ideally adapted to the requirements of the poultry.

These and other advantages of the invention will be further understood and appreciated by those skilled in the art by reference to the following written specification, claims, and appended drawings.

BRIEF DESCRIPTION OF THE DRAWINGS

Preferred embodiments of the invention are described hereinafter with reference to the accompanying Figures in which:

FIG. 4 shows a side view of the embodiment of FIG. 3; and

FIG. 5 shows a front view of the embodiment of FIG. 3.

DETAILED DESCRIPTION OF THE PREFERRED EMBODIMENTS

Figure 1:
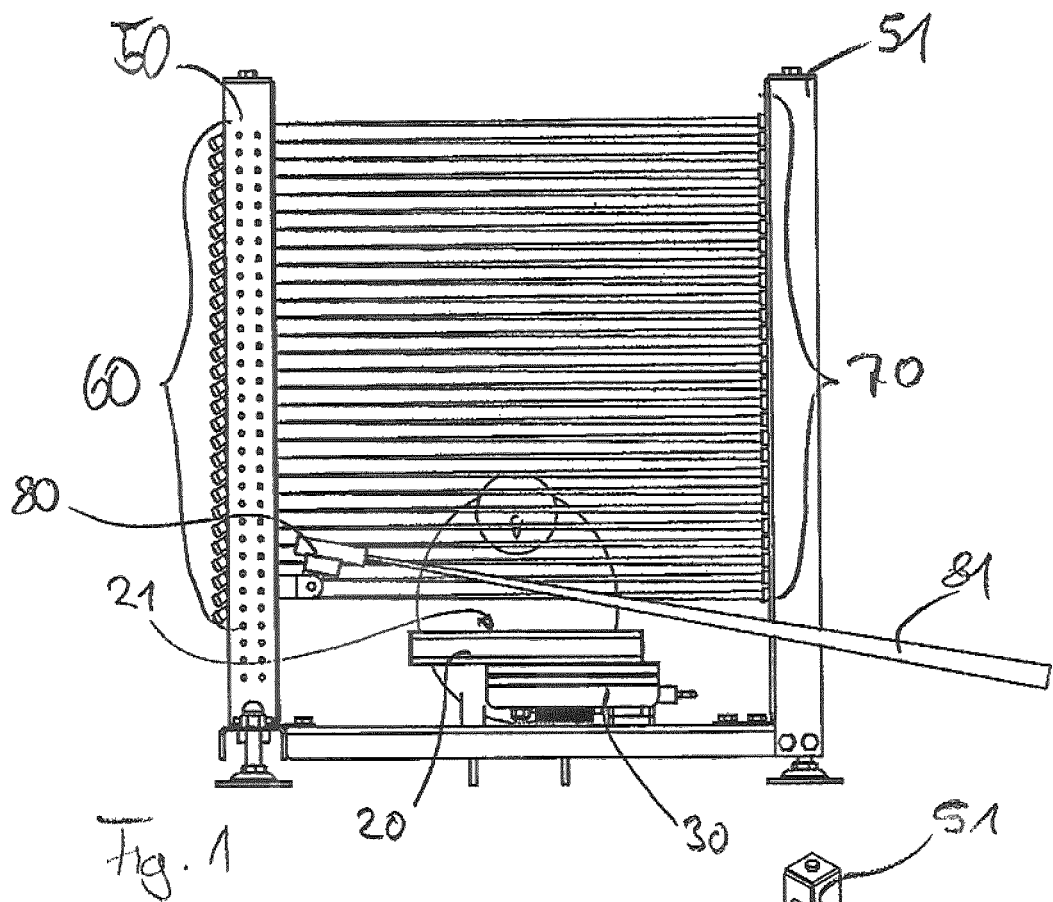
FIG. 1 shows a front view of a first embodiment of the poultry weighing apparatus according to the invention.
Figure 2:
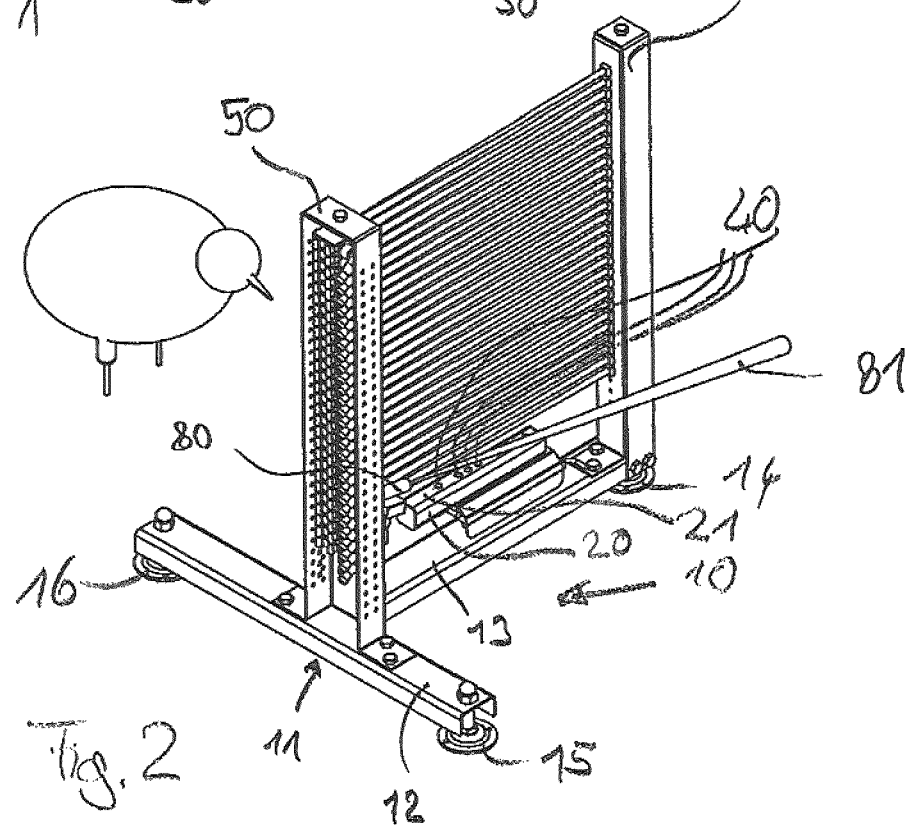
FIG. 2 shows a perspective view taken from the front and laterally above of the embodiment of FIG. 1.

For purposes of description herein, the terms "upper," "lower," "right," "left," "rear," "front," "vertical," and "horizontal" and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting unless the claims expressly state otherwise.

Referring to FIGS. 1 and 2, a first embodiment of the poultry weighing apparatus according to the invention has a T-shaped base carrier structure 10 formed by two U-shaped profiles 12, 13 connected at a connecting location 11. Arranged at each end of the base carrier structure 10 is an adjustable-height support leg 14, 15, 16.

Secured to the U-shaped profile 13 is a support beam 20 having an upper support surface 21. The support surface 21 is of such dimensions so as to accommodate only a single chicken standing thereon with both feet. When a single chicken is standing on that support surface 21 with both feet, no further chicken can stand completely or partially on the support surface 21.

The support beam 20 is supported on the U-shaped profile 13 by means of a force sensor 30. In that way, it is possible to measure the force caused by the weight of a chicken standing on the support surface 21 through the force sensor 30.

In addition, fitted in the support surface 21 are a plurality of temperature sensors 40 for measuring the foot temperature of a chicken on the support surface 21. That makes it possible for temperature measurement of the foot temperature of the chicken to be effected at the same time as measurement of the weight force, and thus the weight force and the foot temperature can both be associated with an individual chicken. Extending substantially centrally from the U-shaped profile 12 in a vertical direction is a profile carrier 50 which is arranged in immediately adjacent relationship with the connecting location 11 between the U-shaped profile 12 and the U-shaped profile 13.

Arranged on the vertical profile carrier 50 is a plurality of radiation emitters 60 which each emit laser radiation in a generally horizontal direction. The radiation emitters 60 are arranged in mutually superposed staggered relationship in a vertical column and are each at a spacing of 1.5 cm relative to each other. It will be appreciated that the spacing between the individual radiation emitters 60 can be selected in accordance with the respectively desired resolution in terms of height measurement, and can also assume values other than 1.5 cm. In particular, it is to be appreciated that the spacing between each two adjacent radiation emitters 60 does not always have to be the same, but that spacing can also vary over the height of the carrier 15.

The radiation emitters 60 each emit a radiation along a common plane 61.

Arranged at the end of the U-shaped profile 13, that is opposite to the profile carrier 50, is a further profile carrier 51. A plurality of radiation receivers 70 are arranged along profile carrier 51. The radiation receivers 70 are arranged in vertically superposed staggered relationship, in the same way as the radiation emitters 60 and the spacing between two adjacent radiation receivers 70 generally corresponds to the spacing between two adjacent radiation emitters 60. The number of radiation emitters 60 and the number of radiation receivers 70 is the same, since each radiation emitter 60 is associated with a radiation receiver 70.

The cooperation of the radiation emitters 60 and the radiation receivers 70 forms a line-shaped grid or raster of height measurement lines. The raster, which is in the plane of the emitted laser beams, is disposed above the support surface 21 in such a way that a chicken standing on the support surface 21 interrupts selected ones of the laser beams, so that the radiation receivers 70 no longer receive any radiation in the region in which the chicken is interrupting the laser radiation. Above the chicken, where the laser beams are not interrupted by the body of the chicken, the radiation receivers 70 however receive radiation. The height of the chicken is therefore determined by the lowest level radiation receiver which receives radiation.

In addition, a non-contact temperature measuring sensor 80 is arranged on the profile carrier 50. The temperature sensor 80 is so oriented that it detects temperature radiation from a narrow, focused, beam-shaped region 81. That narrow focused region 81 extends downwardly at an angle from the temperature sensor 80, and in so doing passes somewhat laterally over the region above the support surface 21. By virtue of that orientation, the temperature sensor 80 detects the body temperature of a chicken disposed on the support surface 21.

The cooperation of the radiation emitters 60 and radiation receivers 70, as well as the non-contact temperature sensor 80, the contact temperature sensors 40, and the force sensor 30 makes it possible to contemporaneously detect the height, weight, temperature of the body of the chicken, and the temperature of the feet of the chicken, and to associate those measurement values with an individual chicken. It is thereby possible to produce a compilation of the essential measurement values relating to the state of health and development of the chicken, and it permits better assessment of the state of health and development of the chicken.

The non-contact temperature sensor 80, by virtue of its downwardly inclined orientation along the temperature measurement region, is directed onto a point on the coop floor adjacent to the poultry weighing apparatus, and detects the temperature from that point on the coop floor when no chicken is standing on the support surface 21. Consequently, a measurement value on the temperature of the coop floor can be obtained from the poultry weighing apparatus, even during a period of time in which there is no measurement of the weight and/or temperature of a chicken, to facilitate optimal regulation of air conditioning in the coop as a function of the coop floor temperature, which is important for a poultry farmer.

Figure 3:
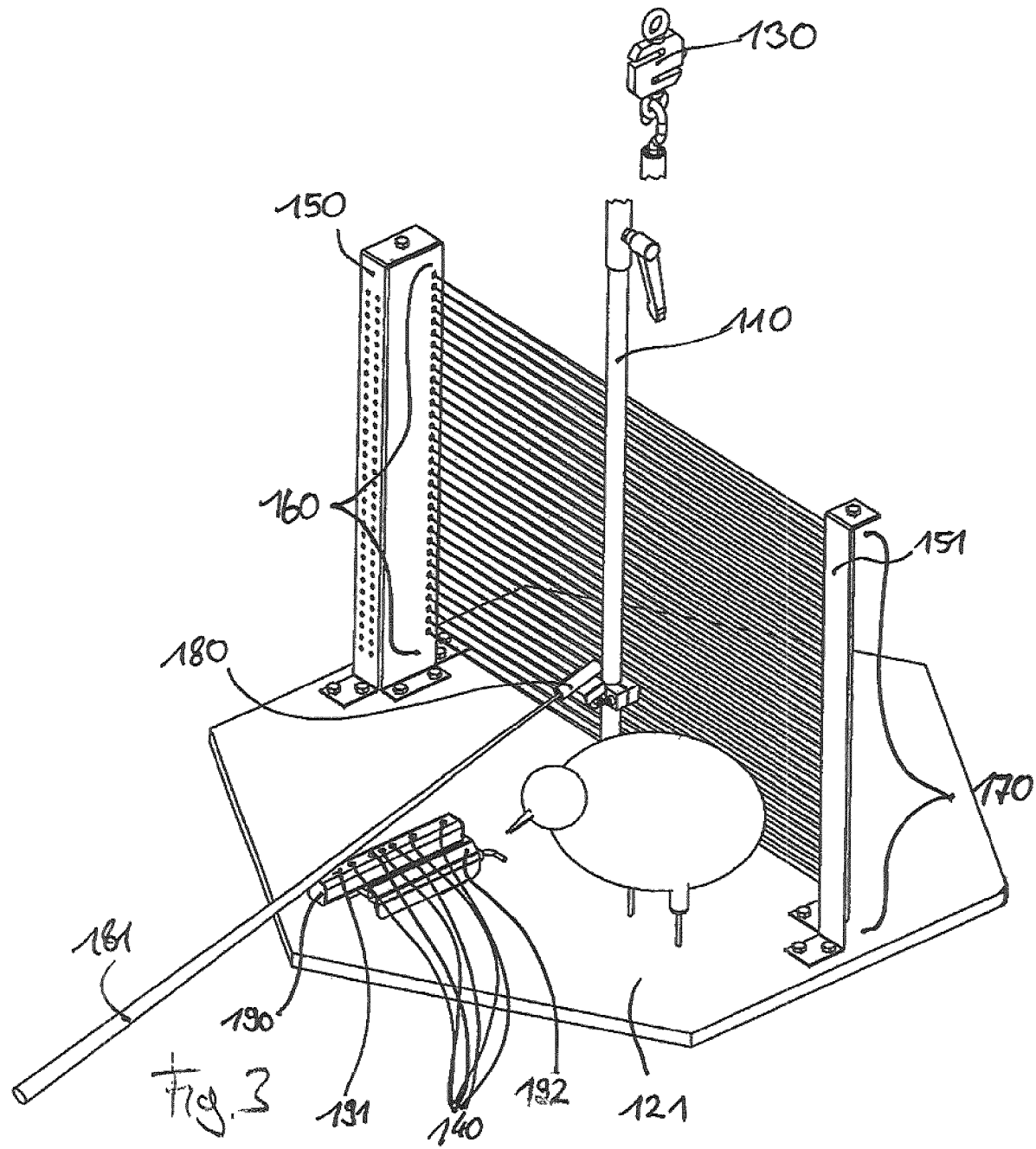
FIG. 3 shows a perspective view taken from the front and laterally above of a second embodiment of the poultry weighing apparatus according to the invention.

Referring now to FIGS. 3 to 5, shown therein is a second embodiment of the invention. The second embodiment has a hexagonal support surface 121 on which a plurality of chicken can stand at the same time. The support surface 121 is coupled by a centrally arranged, hanging linkage 110 to a force sensor 130 connected to the ceiling region of a coop building. In that way, the support surface 121 is supported in a hanging relationship, and can be placed in the region of, for example just above, the coop floor or in a suitably shaped recess in the coop floor.

The weight of all chicken on the support surface 121 is measured by the force sensor 130. In that case, such weight measurement is effected in accordance with the following method. As will be appreciated, constant or permanent monitoring of the weight force relative to time will show fluctuations in the weight force, which are caused by movements of the chickens which are on the support surface 121, and by chickens stepping onto and off of the support surface 121. Such fluctuations in weight are checked from or compared to a reference curve, which reflects the typical range of weight force of the chickens in the coop region, over the development period of those chickens. If the fluctuation in weight is in a weight range which is at the individual weight of a chicken at the corresponding development time, that fluctuation in weight is assessed as an individual weight measurement for a chicken, and is appropriately subjected to further processing, such as, for example, stored for later averaging or stored in an individual grid raster for the association of further measurement values.

A respective profile carrier 150, 151 in which radiation emitters 160, 170 are arranged extends from each of two opposite edges of the hexagonal support surface 121. The placement of the profile carriers 150, 151 and the arrangement and mode of operation of the radiation emitters 160 and radiation receivers 170 are similar to the above-described profile carriers 50, 51, radiation emitters 60, and radiation receivers 70 of the first embodiment, such that further description in that respect will not be included here.

The height measurement plane defined by the laser beams of the radiation emitters 160 extends immediately adjacent to the suspension linkage 110.

Furthermore, on the support surface 121, an additional elevated support surface 191 is arranged on a support beam 190. The support surface 191 on the support beam 190 corresponds to the support surface 21 on the support beam 20 of the first embodiment and is arranged in the same manner, with force sensor 192 disposed between the support beam 190 and the support surface 121. Also in the same manner, fitted into the additional elevated support surface 191 is a multiplicity of temperature sensors 140 for detecting the foot temperature of a chicken standing on the support surface 191.

In addition, a non-contact radiation temperature sensor 180 is placed on the suspension linkage 110, and receives temperature radiation readings from a narrow, closely focused radiation region 181, which extends downwardly at an angle from the temperature sensor 180. The radiation region 181 of the temperature sensor 180 extends exactly over the support surface 191, so that the temperature of the body of a chicken on the additional support surface 191 can be measured with the non-contact temperature sensor 180. In that way it is possible, in regard to a chicken on the support surface 191, to contemporaneously ascertain the foot temperature, the body temperature, and the weight force of an individual chicken on surface 191.

In the same manner as described above relative to the embodiment shown in FIGS. 1 and 2, when there is no chicken in the measurement region 181 of the temperature sensor 180, the temperature sensor 180 detects the temperature of the surrounding coop floor. Because the support surface 121 is suspended in a freely hanging, and possibly also rotatable condition, the point that the temperature sensor 180 measures on the coop floor is not always the same point. Rotation of the support surface 121 means that a substantially annular region disposed therearound is scanned, so that it is possible to achieve floor temperature averaging over a larger region of the coop floor.

The poultry weighing apparatus according to the present invention thus makes it possible to obtain precise information about the height of the individual birds, as well as information about the average height of the poultry stock. In that way, an additional measurement value, which is important for assessing the condition of the poultry, is obtained and associated with the weight of individual birds.

In particular, that measurement value is suitable for adjustment of the height of a drinking trough and/or a feeding mechanism for the chickens within the coop, on the basis of the measurement value. It is known that, for healthy development of the poultry stock, it is advantageous for the height of the drinking trough and the feeding mechanism to be adjusted so that the birds neither have to bend down or reach up too far to pick up food or liquid. Feeding and drinking is made easier for the birds by virtue of a correctly adjusted height. At the same time, soiling caused by liquid or food being spread around, which is detrimental to hygiene, is avoided. In particular, it is possible to provide an actuator, such as for example a servo motor, which by way of a suitable mechanical coupling, displaces or shifts the drinking trough and the feeding mechanism as a function of the height measurement signal. In that respect, it is possible to provide separate actuators for the drinking trough and the feeding mechanism. Alternatively, it is also possible to provide a single actuator which adjusts the height of both the drinking trough and also the feeding mechanism.

In the foregoing description, it will be readily appreciated by those skilled in the art that modifications may be made to the invention without departing from the concepts disclosed herein. Such modifications are to be considered as included in the following claims, unless these claims by their language expressly state otherwise.

We claim:

1. An apparatus for weighing an individual fowl in a poultry house or the like, comprising:
    a support surface shaped to support a plurality of live fowls standing thereon;
    a force sensor operably connected with said support surface, continually detecting the weight force of the fowl or fowls standing thereon during operation, and generating an associated weight force sensor signal;
    an evaluation unit operably connected with said force sensor, having prestored weight data for individual fowls of a corresponding age, and comparing sudden changes in said weight force sensor signal potentially associated with an individual fowl moving onto or off of the support surface with said prestored weight data to define a weight difference which is only recorded as the weight of an individual fowl on said support surface when said weight force difference is within a stored, predetermined range of individual fowl weight forces of fowls of the corresponding age.

2. An apparatus as set forth in claim 1, including:
    a second sensor operably connected with the said support surface and detecting another measurement parameter of the one or more fowls standing on said support surface, which measurement parameter is different from said weight force.

3. An apparatus as set forth in claim 2, wherein:
    said second sensor comprises a sensor for measuring the height of one or more of the fowls standing on said support surface.

4. An apparatus as set forth in claim 3, wherein:
said second sensor for measuring the height of the one or more fowls on said support surface includes a plurality of light barrier devices arranged in a vertically extending row disposed above said support surface, each of which includes a radiation emitter and a radiation receiver which are adapted to detect an interruption in at least one horizontal beam extending between said radiation emitter and said radiation receiver.

5. An apparatus as set forth in claim 4, wherein:
said radiation emitters are arranged on a first bar extending vertically from said support surface, and said radiation receivers are arranged on a second bar extending vertically from said support surface at a location laterally spaced apart from said first bar, so as to measure the height of a fowl positioned between said first and second bars.

6. An apparatus as set forth in claim 1, including:
a temperature sensor operably connected with said support surface, and configured to measure the body temperature of a fowl on said support surface.

7. An apparatus as set forth in claim 6, wherein:
said temperature sensor comprises a radiation receiver which receives temperature radiation for a defined region of said apparatus.

8. An apparatus as set forth in claim 7, wherein:
said temperature sensor is disposed generally above said support surface, and is inclined downwardly to pass through a horizontal plane that is located beside said support surface and coplanar with the same.

9. An apparatus for weighing live poultry and the like, comprising:
a support surface shaped to support only a single fowl standing thereon;
a force sensor operably connected with said support surface, continually detecting the weight force of the fowl standing thereon during operation, and generating an associated weight force sensor signal;
an evaluation unit operably connected with said force sensor, having prestored weight data for individual fowls, and comparing sudden changes in said weight force sensor signal with said prestored weight data to define a weight difference which is recorded as the weight of the single fowl on said support surface only when said weight force difference is within a stored, predetermine range;
a first temperature sensor operably connected with said support surface, said first temperature sensor configured to measure the body temperature of a fowl on said support surface, wherein said first temperature sensor comprises a radiation receiver which receives temperature radiation for a defined region of said apparatus, and wherein said first temperature sensor is disposed generally above said support surface, and is inclined downwardly to pass through a horizontal plane that is located beside said support surface and coplanar with the same; and
a second temperature sensor located on said support surface and detecting the temperature of at least one of the feet of the fowl on said support surface.

10. An apparatus for weighing live poultry in poultry houses and the like, comprising:
a first support surface shaped to support a plurality of live fowls standing thereon;
a force sensor operably connected with said support surface, and detecting the weight force of the fowl or fowls standing thereon;
a reduced size second support surface provided above said first support surface and adapted to receive only one fowl at time thereon;
a contact temperature sensor associated with said second support surface which detects the temperature of the feet of the fowl standing thereon; and
a radiation temperature sensor disposed above said second support surface and oriented to receive radiation from the region of said second support surface on which the body of the fowl is disposed.

11. An apparatus as set forth in claim 10, including:
an evaluation unit receiving a signal from said force sensor, having a second sensor and prestored weight data for individual fowls, and comparing sudden changes in said weight force sensor signal with said prestored weight data or a reference graph.

12. A poultry weighing apparatus, comprising:
a support surface configured to permit at least one fowl to stand thereon;
a force sensor operably connected with said support surface and detecting the weight of the fowl or fowls standing on said support surface;
a second sensor operably connected with said support surface and detecting at least one additional physical characteristic, other than weight, of the fowl or fowls standing on said support surface; and wherein
said support surface defines a first support surface and is adapted to receive and support thereon a plurality of fowls; and including
a reduced-size second support surface provided above said first support surface and adapted to receive only one fowl at a time thereon;
a contact temperature sensor arranged in said second support surface which detects the temperature of the feet of the fowl standing thereon; and
a non-contact radiation temperature sensor arranged above said second support surface and oriented to receive radiation from the region adjacent to said second support surface on which the body of the fowl is disposed.

* * * * *